US012151474B2

(12) United States Patent
Yamane

(10) Patent No.: US 12,151,474 B2
(45) Date of Patent: Nov. 26, 2024

(54) INKJET PRINTER HAVING TRANSMISSION ANTENNA CONNECTED TO CONTROL BOARD PROVIDED IN CASING AND RECEPTION ANTENNA PROVIDED IN CARRIAGE

(71) Applicant: BROTHER KOGYO KABUSHIKI KAISHA, Nagoya (JP)

(72) Inventor: Yukinori Yamane, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 68 days.

(21) Appl. No.: 17/586,506

(22) Filed: Jan. 27, 2022

(65) Prior Publication Data

US 2022/0242111 A1 Aug. 4, 2022

(30) Foreign Application Priority Data

Jan. 29, 2021 (JP) ................................ 2021-013955

(51) Int. Cl.
*B41J 2/045* (2006.01)
*B41J 29/393* (2006.01)

(52) U.S. Cl.
CPC ....... *B41J 2/04541* (2013.01); *B41J 2/04581* (2013.01); *B41J 2029/3937* (2013.01)

(58) Field of Classification Search
CPC ................................................ B41J 2029/3937
See application file for complete search history.

(56) References Cited

U.S. PATENT DOCUMENTS

2003/0085946 A1* 5/2003 Meados ............. H04N 1/00519 347/50
2004/0239706 A1* 12/2004 Kawakami ........... B41J 2/17546 347/7
2008/0238704 A1 10/2008 Conway et al.
(Continued)

FOREIGN PATENT DOCUMENTS

JP 2010009556 A * 1/2010
JP 2013091256 A * 5/2013
(Continued)

OTHER PUBLICATIONS

Japan Patent Office, Notice of Reasons for Refusal issued in Japanese Patent Application No. 2021-013955, dated Aug. 27, 2024.

*Primary Examiner* — Shelby L Fidler
(74) *Attorney, Agent, or Firm* — Baker Botts L.L.P.

(57) ABSTRACT

An inkjet printer includes: a casing; a first control board; a carriage; a head; a transmission antenna; and a reception antenna. The first control board is configured to reciprocate in a scanning direction crossing a conveying direction of a recording medium. The head is mounted in the carriage and has a plurality of nozzles. The transmission antenna is connected to the first control board. The transmission antenna is configured to transmit, through near field communication, an ejection signal for controlling ejection of ink from the plurality of nozzles. The reception antenna is provided in the carriage. The reception antenna is configured to receive the ejection signal from the transmission antenna. The near field communication has a communication range smaller than a size of the casing.

10 Claims, 9 Drawing Sheets

(56) References Cited

U.S. PATENT DOCUMENTS

| | | | | |
|---|---|---|---|---|
| 2013/0155450 | A1* | 6/2013 | Higashikawa | B41J 2/1752 358/1.15 |
| 2013/0249302 | A1* | 9/2013 | An | H02J 50/10 307/104 |
| 2014/0292871 | A1 | 10/2014 | Kondo | |
| 2020/0127703 | A1* | 4/2020 | Yukimasa | H04L 25/00 |
| 2020/0223240 | A1* | 7/2020 | Gabella | B41J 19/202 |

FOREIGN PATENT DOCUMENTS

| | | | | |
|---|---|---|---|---|
| JP | 2013-147015 | A | | 8/2013 |
| JP | 2014004755 | A | * | 1/2014 |
| JP | 2017-193184 | A | | 10/2017 |

* cited by examiner

INKJET PRINTER HAVING TRANSMISSION ANTENNA CONNECTED TO CONTROL BOARD PROVIDED IN CASING AND RECEPTION ANTENNA PROVIDED IN CARRIAGE

CROSS REFERENCE TO RELATED APPLICATIONS

This application claims priority from Japanese Patent Application No. 2021-013955 filed Jan. 29, 2021. The entire content of the priority application is incorporated herein by reference.

BACKGROUND

A conventional inkjet printer has a control board provided in the body of the printer. Ejection control data for controlling the ejection of ink from nozzles is transmitted from the control board to the inkjet head via wiring, such as flexible flat cables (FFCs).

The conventional inkjet printer, for example, has one FFC for transmitting signals representing ejection control data from the control board to the inkjet head, and another FFC for supplying power from the circuit board to the inkjet head. The inkjet printer is also provided with tubes for supplying ink to the inkjet head. The tubes are disposed between the two FFCs to prevent noise emitted from the signal transmission FFC from adversely affecting the other FFC and the like.

SUMMARY

However, when the conventional inkjet printer attempts to transmit a large volume of ejection control data from the control board to the inkjet head at a high rate of speed, the signal transmission FFC generates a large amount of noise that could interfere with communication.

In view of the foregoing, it is an object of the present disclosure to provide an inkjet printer that prevents communication interference due to noise produced from signal transmission wiring.

In view of the foregoing, it is an object of the disclosure to provide an inkjet printer including: a casing; a first control board; a carriage; a head; a transmission antenna; and a reception antenna. The first control board is provided in the casing. The carriage is configured to reciprocate in a scanning direction crossing a conveying direction of a recording medium. The head is mounted in the carriage and has a plurality of nozzles. The transmission antenna is connected to the first control board. The transmission antenna is configured to transmit, through near field communication, an ejection signal for controlling ejection of ink from the plurality of nozzles. The reception antenna is provided in the carriage. The reception antenna is configured to receive the ejection signal from the transmission antenna. The near filed communication has a communication range smaller than a size of the casing.

With the inkjet printer according to the configuration described above, the transmission antenna connected to the first control board transmits an ejection signal to the reception antenna provided in the carriage through near field communication. This process enables the first control board to control the ejection of ink from the plurality of nozzles. Hence, the inkjet printer need not be provided with dedicated wiring for transmitting the ejection signal. The above configuration can prevent noise generated in such signal transmission wiring from interfering with communication. Further, power consumption is less when using a transmission antenna that has a communication range smaller than the size of the casing rather than when using a wide-range antenna.

The inkjet printer according to one embodiment of the present disclosure can prevent noise generated in signal transmission wiring from interfering with communication.

BRIEF DESCRIPTION OF THE DRAWINGS

The particular features and advantages of the disclosure as well as other objects will become apparent from the following description taken in connection with the accompanying drawings, in which.

DETAILED DESCRIPTION

First Embodiment

Figure 1:
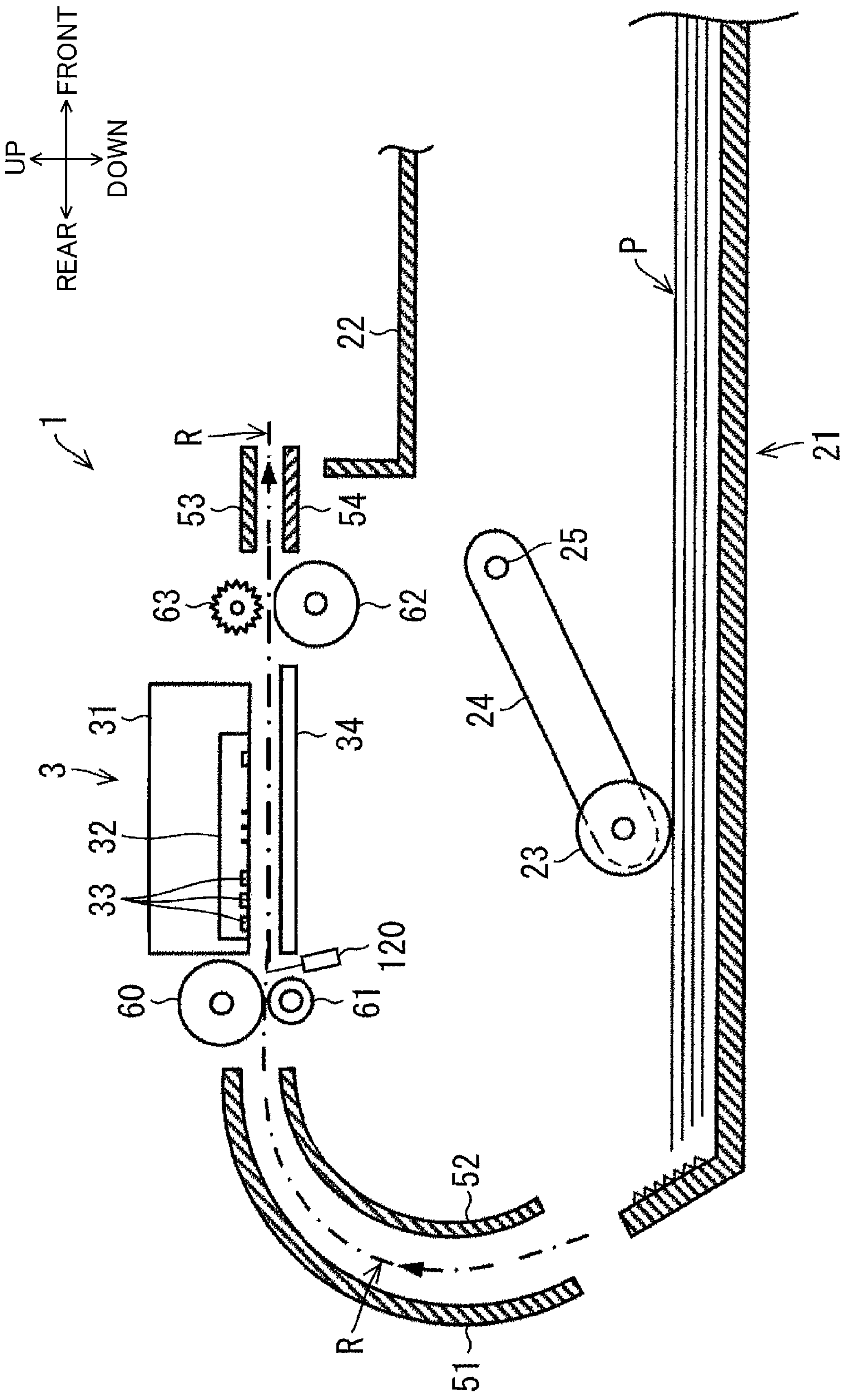
FIG. 1 is a schematic diagram illustrating an internal structure of an inkjet printer according to the present disclosure.
Figure 2:
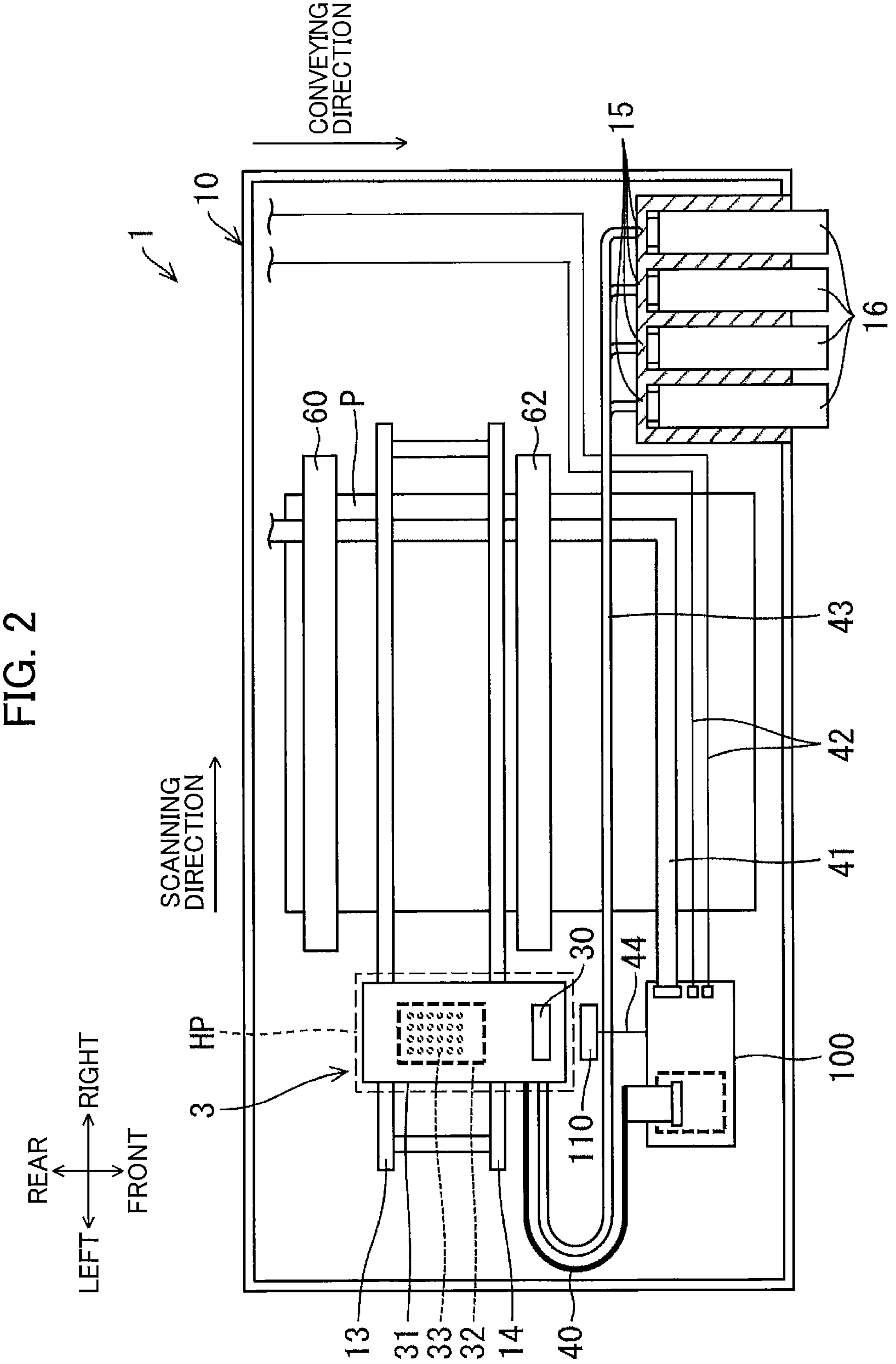
FIG. 2 is a plan view illustrating an internal layout of the inkjet printer illustrated in FIG. 1.

Next, an inkjet printer 1 according to a first embodiment of the present disclosure will be described with reference to FIGS. 1 through 6. FIG. 1 is a schematic diagram showing the internal structure of the inkjet printer 1 according to the first embodiment. FIG. 2 is a plan view showing the internal layout of the inkjet printer 1 according to the first embodiment. For convenience, up-down, front-rear, and left-right directions relative to the inkjet printer 1 are defined in the following description as indicated by the arrows in FIGS. 1 and 2.

The inkjet printer 1 is a multifunction peripheral (MFP) having a plurality of functions, such as a scan function, a print function, a copy function, and a facsimile function. The print function of the inkjet printer 1 employs an inkjet printing system for recording images based on print data on sheets P of paper by ejecting ink. The sheets P are examples of the recording medium of the present disclosure. Note that the sheets P are not limited to a paper medium but may be a resin medium, such as transparency sheets. Additionally, the inkjet printer 1 may be a printer having only a printing function.

As shown in FIGS. 1 and 2, the inkjet printer 1 is provided with a rectangular box-like casing 10 and, disposed within the casing 10, a feed tray 21, a discharge tray 22, a feed roller 23, a conveying path R, conveying rollers 60 and 62, and an image-recording unit 3. The conveying rollers 60 and 62 are examples of the conveying portion of the present disclosure.

The feed tray 21 is a box-shaped tray that is open on the top. The feed tray 21 is disposed so as to be movable in the front-rear direction through an opening formed in the front surface of the inkjet printer 1. The feed tray 21 accommodates sheets P therein. The sheets P are of a standardized size, such as the A4 size. The discharge tray 22 is disposed above the feed tray 21. The discharge tray 22 supports sheets P discharged from the casing 10 by the conveying roller 62.

The feed roller 23 is a member provided for feeding sheets P accommodated in the feed tray 21 onto the conveying path R. The feed roller 23 is rotatably supported on the distal end of a feed arm 24. The feed arm 24 is pivotably supported on a shaft 25, which in turn is supported in a frame of the inkjet printer 1. The feed arm 24 is urged to pivot toward the feed tray 21 by its own weight or an elastic force generated through a spring or the like.

The conveying path R refers to space formed by a guide member 51, a guide member 52, the image-recording unit 3, a guide member 53, a guide member 54, and the like. The conveying path R extends upward from the rear end of the feed tray 21, curving in the region defined by the guide members 51 and 52, and then extends straight past the position of the image-recording unit 3 and through the region defined by the guide members 53 and 54 until reaching the discharge tray 22.

The conveying roller 60 is disposed along the conveying path R upstream of the image-recording unit 3 in the conveying direction. A pinch roller 61 is disposed at a position below and opposing the conveying roller 60. A conveying motor 108 (see FIG. 3) drives the conveying roller 60 to rotate. The pinch roller 61 rotates along with the rotation of the conveying roller 60. While a sheet P is nipped between the conveying roller 60 and pinch roller 61, the forward rotation of the conveying roller 60 and pinch roller 61 convey the sheet P along the conveying path R to the image-recording unit 3. Note that the conveying direction corresponds to the direction in which the sheet P is discharged from the casing 10.

As shown in FIG. 1, the conveying roller 62 is disposed along the conveying path R downstream of the image-recording unit 3 in the conveying direction. A spur roller 63 is disposed at a position above and opposing the conveying roller 62. The conveying motor 108 drives the conveying roller 62 to rotate. The spur roller 63 rotates along with the rotation of the conveying roller 62. When a sheet P is nipped between the conveying roller 62 and spur roller 63, the forward rotation of the conveying roller 62 and spur roller 63 discharges the sheet P into the discharge tray 22.

A rotary encoder 111 (see FIG. 3) is provided on the conveying roller 60 for detecting the rotation of the conveying roller 60. The rotary encoder 111 outputs a pulse signal to a first control board 100 (described later) based on the rotation of the conveying roller 60.

As shown in FIG. 1, a registration sensor 120 is also disposed on the conveying path R between the conveying roller 60 and the image-recording unit 3. The registration sensor 120 detects sheets P passing the position on the conveying path R at which sheets P contact the conveying roller 60. The registration sensor 120 may be a sensor provided with an actuator that pivots when contacted by a sheet P, a photosensor, or the like. The registration sensor 120 outputs an ON signal while a sheet P is passing the contact position of the sheet P and conveying roller 60 and outputs an OFF signal when a sheet P is not passing this contact position. Detection signals from the registration sensor 120 are outputted to the first control board 100.

As shown in FIG. 1, the image-recording unit 3 is disposed along the conveying path R between the conveying roller 60 and conveying roller 62. The image-recording unit 3 has a carriage 31, a head 32, a plurality of nozzles 33, and a platen 34.

The head 32 is supported in the carriage 31. The nozzles 33 are formed in the bottom surface of the head 32. The head 32 ejects ink droplets from the nozzles 33 by vibrating piezoelectric elements or other vibration elements. The platen 34 is a rectangular plate-shaped member that supports sheets P. The image-recording unit 3 controls the head 32 to record an image on a sheet P supported on the platen 34 by selectively ejecting ink droplets from nozzles 33 based on image data.

As shown in FIG. 2, two guide rails 13 and 14 provided in the casing 10 extend in the left-right direction parallel to each other. The guide rails 13 and 14 guide the carriage 31 as the carriage 31 reciprocates in a scanning direction. The scanning direction corresponds to the width direction of the sheet P and crosses the conveying direction of the sheet P. Specifically, a carriage motor 109 (see FIG. 3) transmits a drive force to the carriage 31 for moving the carriage 31 back and forth between a holding position HP and an ejection terminating position EP, as illustrated in FIG. 4. In other words, the carriage 31 reciprocates between the holding position HP and the ejection terminating position EP.

The holding position HP is a position at which the carriage 31 is held in an idle state. During an idle state, ink is not ejected from nozzles 33 onto sheets P. In the first embodiment, the holding position HP is outside the region through which the sheet P passes, and specifically to the left of this region (pass-through region) along the scanning direction. The ejection terminating position EP refers to the position at which image recording is completed for one pass (described later).

A linear encoder 121 is disposed on the carriage 31. The linear encoder 121 outputs an encoder signal to the first control board 100 based on displacement of the carriage 31 in the width direction of the sheet P.

While not shown in the drawings, the linear encoder 121 is provided with a linear scale and an optical sensor. The scale is arranged on the top surfaces of the guide rails 13 and 14 and extends along the scanning direction over the entire reciprocating range of the carriage 31. The scale is provided with a plurality each of transmissive areas and non-transmissive areas that alternate along the scanning direction. The optical sensor is supported on the carriage 31. The optical sensor is mounted on the carriage 31. The optical sensor includes a light-emitting element and a light-receiving element arranged on opposite sides of the scale. The light-emitting element irradiates light toward the light-receiving element, and the light-receiving element receives light emitted from the light-emitting element. Light emitted by the light-emitting element passes through the transmissive areas but is blocked by the non-transmissive areas. By detecting light passing through transmissive areas and blocked by non-transmissive areas, the linear encoder 121 can detect the position of the carriage 31 in the scanning direction.

The inkjet printer 1 is also provided with four cartridge holders 15 disposed in the right side of the casing 10. The cartridge holders 15 are juxtaposed in the scanning direction. Four ink cartridges 16 are detachably mounted in the respective cartridge holders 15. The ink cartridges 16 hold ink in the colors black, yellow, cyan, and magenta, beginning in order from the ink cartridge 16 mounted in the rightmost cartridge holder 15.

Four tubes 43 connect the four ink cartridges 16 to the head 32. Ink in the ink cartridges 16 can be supplied to the head 32 through the tubes 43.

The first control board 100 described later is disposed in the left-front region of the casing 10. The first control board 100 is connected to a flexible flat cable (FFC) 40, a wiring harness 41, cables 42, a wiring harness 44, and the like.

Figure 3:
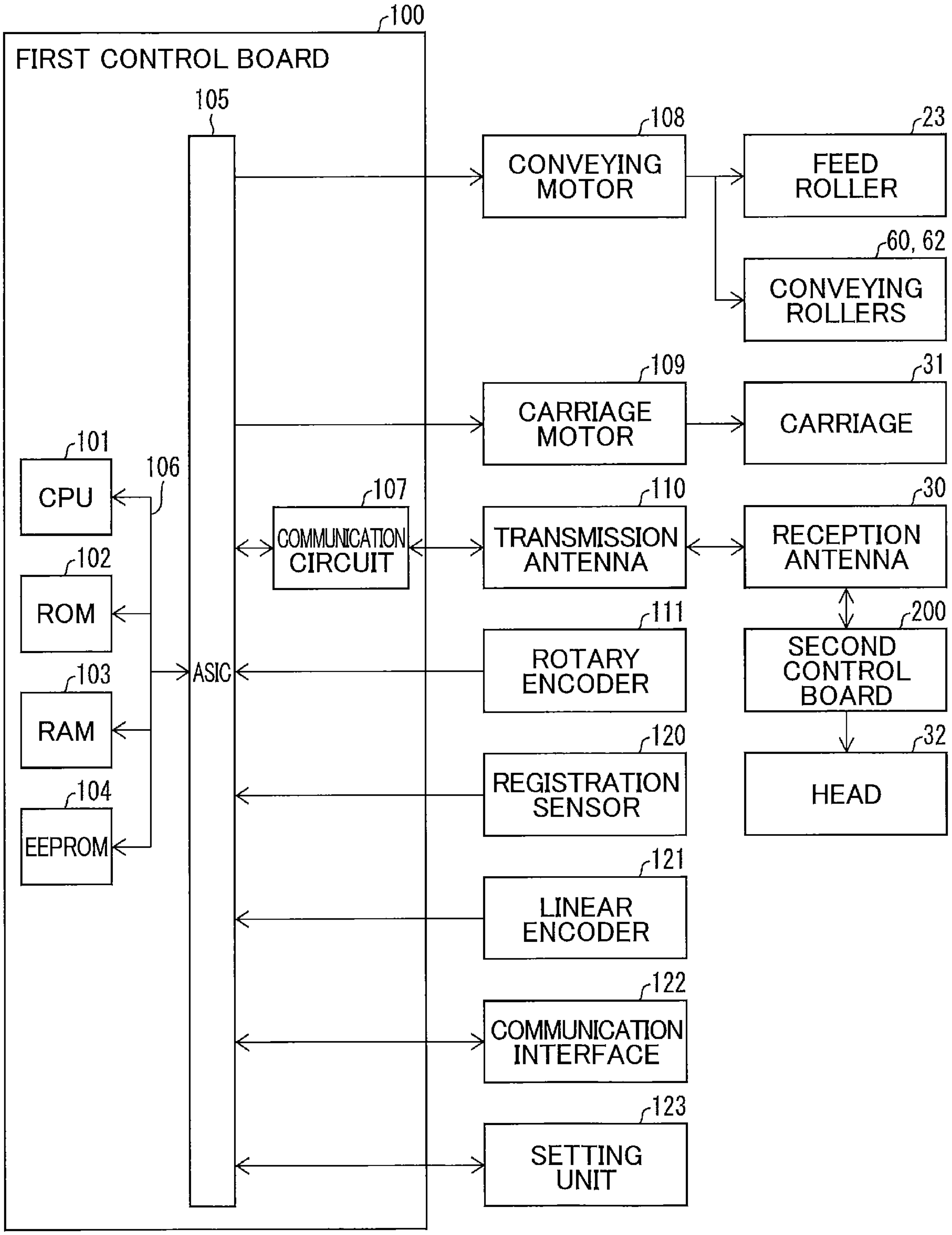
FIG. 3 is a block diagram illustrating an electrical structure of the inkjet printer.
Figure 4:
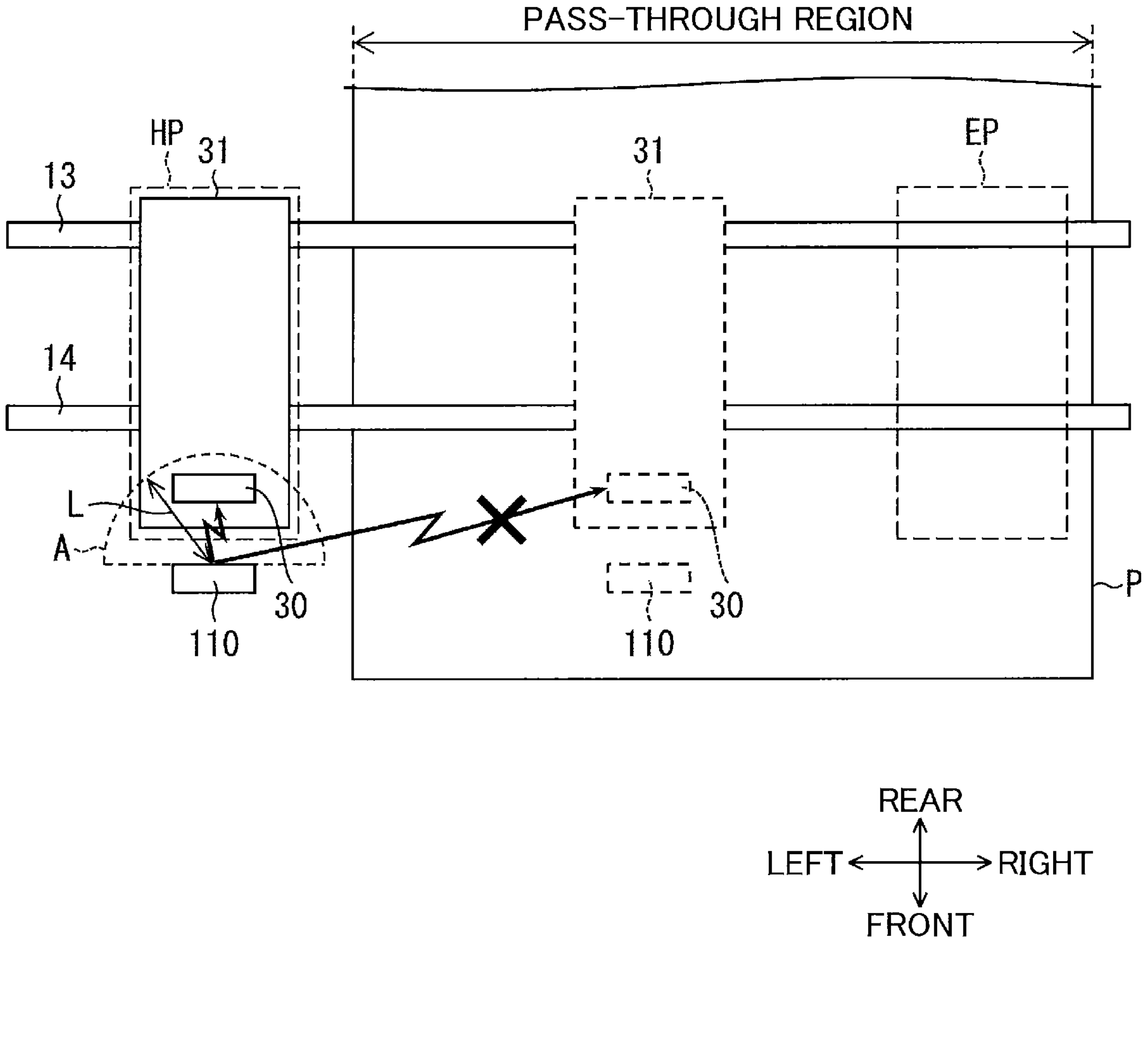
FIG. 4 is a schematic diagram illustrating an example of a communication range for a transmission antenna of the inkjet printer.

The FFC 40 is a flexible belt-like member that connects the first control board 100 to a second control board 200 (see FIG. 3). The second control board 200 is provided in the carriage 31 for controlling ink ejection from the nozzles 33 formed in the head 32. The FFC 40 extends leftward from the left side of the recording head 32, curving toward the downstream side in the conveying direction, and bends back toward the right to connect to the first control board 100. A plurality of wires is formed in the FFC 40. The wires include wires for supplying power to the head 32 and wires for transmitting signals from sensors, for example.

The wiring harness 41 and cables 42 are led out rightward in the scanning direction from the first control board 100 and are arranged so as not to overlap the FFC 40 in a plan view when the carriage 31 moves along the scanning direction. The wiring harness 41 is provided for connecting the first control board 100 of the inkjet printer 1 to a scanner 11 (see FIG. 9), for example. The cables 42 may include a LAN cable for connecting the first control board 100 to a LAN port and a USB cable for connecting the first control board 100 to a USB port when the inkjet printer 1 is provided with such LAN and USB ports.

As shown in FIG. 2, a transmission antenna 110 is disposed in the left side of the casing 10. The transmission antenna 110 has a rectangular plate shape. The transmission antenna 110 functions to transmit ejection signals to a reception antenna 30 for controlling ink ejection from nozzles 33. The ejection signals correspond to the image data described above.

The reception antenna 30 is disposed on the top surface of the carriage 31 at the front end thereof. The reception antenna 30 has a rectangular plate-like external shape and is provided for receiving ejection signals from the transmission antenna 110. Note that the external shapes of the transmission antenna 110 and the reception antenna 30 are not limited to flat plate-like shapes but may be cylindrical shapes, for example.

The transmission antenna 110 is disposed in a position opposing the reception antenna 30 when the carriage 31 is in the holding position HP. Here, the position in which the reception antenna 30 faces the transmission antenna 110 is said to be a position in which a surface of the transmission antenna 110 extending along the longitudinal direction of the same faces a surface of the reception antenna 30 extending along the longitudinal direction of the same. Therefore, the transmission antenna 110 and the reception antenna 30 in the first embodiment extend in the same direction.

<Electrical Structure of the Inkjet Printer>

FIG. 3 is a block diagram showing the electrical structure of the inkjet printer 1 according to the first embodiment. As shown in FIG. 3, the first control board 100 has a CPU 101, a ROM 102, a RAM 103, an EEPROM ("EEPROM" is a Japanese registered trademark of Renesas Electronics Corporation.) 104, and an ASIC 105. The CPU 101, ROM 102, RAM 103, EEPROM 104, and ASIC 105 are interconnected via an internal bus 106.

The ROM 102 stores programs and the like with which the CPU 101 controls the various operations of the inkjet printer 1. The RAM 103 is used as a storage area for temporarily storing data, signals, and the like used when the CPU 101 executes the programs described above or as a work area for data processing. The EEPROM 104 stores settings information that must be preserved after power to the inkjet printer 1 is turned off. The first control board 100 controls the head 32, conveying motor 108, and carriage motor 109 based on a control program read from the ROM 102.

The ASIC 105 is connected to the conveying motor 108, carriage motor 109, transmission antenna 110, rotary encoder 111, and registration sensor 120 described above, as well as a communication interface 122 and a setting unit 123.

The ASIC 105 supplies a drive current to the conveying motor 108 and carriage motor 109 via a drive circuit (not shown). The conveying motor 108 and carriage motor 109 are DC motors that rotate at a faster speed when the supplied drive current is larger and at a slower speed when the supplied current is smaller. The first control board 100 controls the rotations of the conveying motor 108 and carriage motor 109 through pulse width modulation (PWM) control, for example.

The first control board 100 also has a communication circuit 107. The communication circuit 107 outputs ejection signals to the transmission antenna 110. The reception antenna 30 receives ejection signals from the transmission antenna 110 and outputs those ejection signals to the second control board 200.

The second control board 200 is disposed on the top surface of the carriage 31. The second control board 200 has a flat plate-like external shape that follows the top surface of the carriage 31. In other words, the second control board 200 occupies a plane extending in the conveying direction and the scanning direction. The second control board 200 controls the drive voltages applied to piezoelectric elements in the head 32 based on the ejection signals in order to eject ink droplets from the nozzles 33 for recording an image on the sheet P. The image data may be stored in a memory provided in the second control board 200.

The first control board 100 detects the state of the inkjet printer 1 based on signals outputted from the registration sensor 120, rotary encoder 111, and linear encoder 121. Specifically, the first control board 100 infers the position of a sheet P along the conveying path R based on pulse signals outputted from the rotary encoder 111 after an ON signal has been outputted from the registration sensor 120. The first control board 100 also detects the position of the carriage 31 in the width direction of the sheet P based on encoder signals inputted from the linear encoder 121.

The communication interface 122 is connected to a network, such as a LAN and is capable of connecting to external devices having a driver for the inkjet printer 1 installed. The first control board 100 can receive print jobs via the communication interface 122.

The setting unit 123 is disposed on the front surface of the inkjet printer 1. The setting unit 123 has a display screen that includes a touch panel, for example. Through touch operations on the setting unit 123, the user can perform various settings related to printing on the inkjet printer 1 and the like. Various information set by the setting unit 123 is inputted into the first control board 100.

<Detailed Structure of the Transmission Antenna and Reception Antenna>

On the inkjet printer 1 according to the first embodiment, ejection signals are exchanged between the transmission antenna 110 and the reception antenna 30 using TransferJet, a near field communication technology. "TransferJet" is a Japanese registered mark of TransferJet Consortium Incorporated Association. Through communication with TransferJet, one device is capable of finding other devices that have entered the communication range of the one device. Communication with TransferJet also enables the one-on-one exchange of signals between two devices in close proximity.

The schematic diagram of FIG. 4 shows an example of a communication range A for the transmission antenna 110 of the inkjet printer 1 according to the first embodiment. The communication range A of the transmission antenna 110 shown in the example of FIG. 4 is set to a semicircular range having a radius of about 3 cm. The communication range in this case is a range from the transmission antenna 110 in which the reception antenna 30 must be present to receive signals transmitted from the transmission antenna 110. In other words, a transfer distance L denoting the maximum distance between the transmission antenna 110 and reception antenna 30 at which communication is possible is set to about 3 cm. Accordingly, ejection signals can only be communicated in the inkjet printer 1 of the first embodiment when the transmission antenna 110 and reception antenna 30 overlap each other in the left-right direction, i.e., the scanning direction, as indicated in FIG. 4.

On the other hand, when the carriage 31 separates from the holding position HP so that the reception antenna 30 no longer overlaps the transmission antenna 110 in the scanning direction, the reception antenna 30 cannot receive ejection signals transmitted from the transmission antenna 110.

Note that the transmission antenna 110 can transmit image data at a maximum speed of about 560 Mbps using TransferJet. The transmission antenna 110 may use TransferJet X instead of TransferJet. With TransferJet X, the transmission antenna 110 can transmit a larger volume of image data than with TransferJet.

<Control Steps with the First Control Board>

Figure 5:
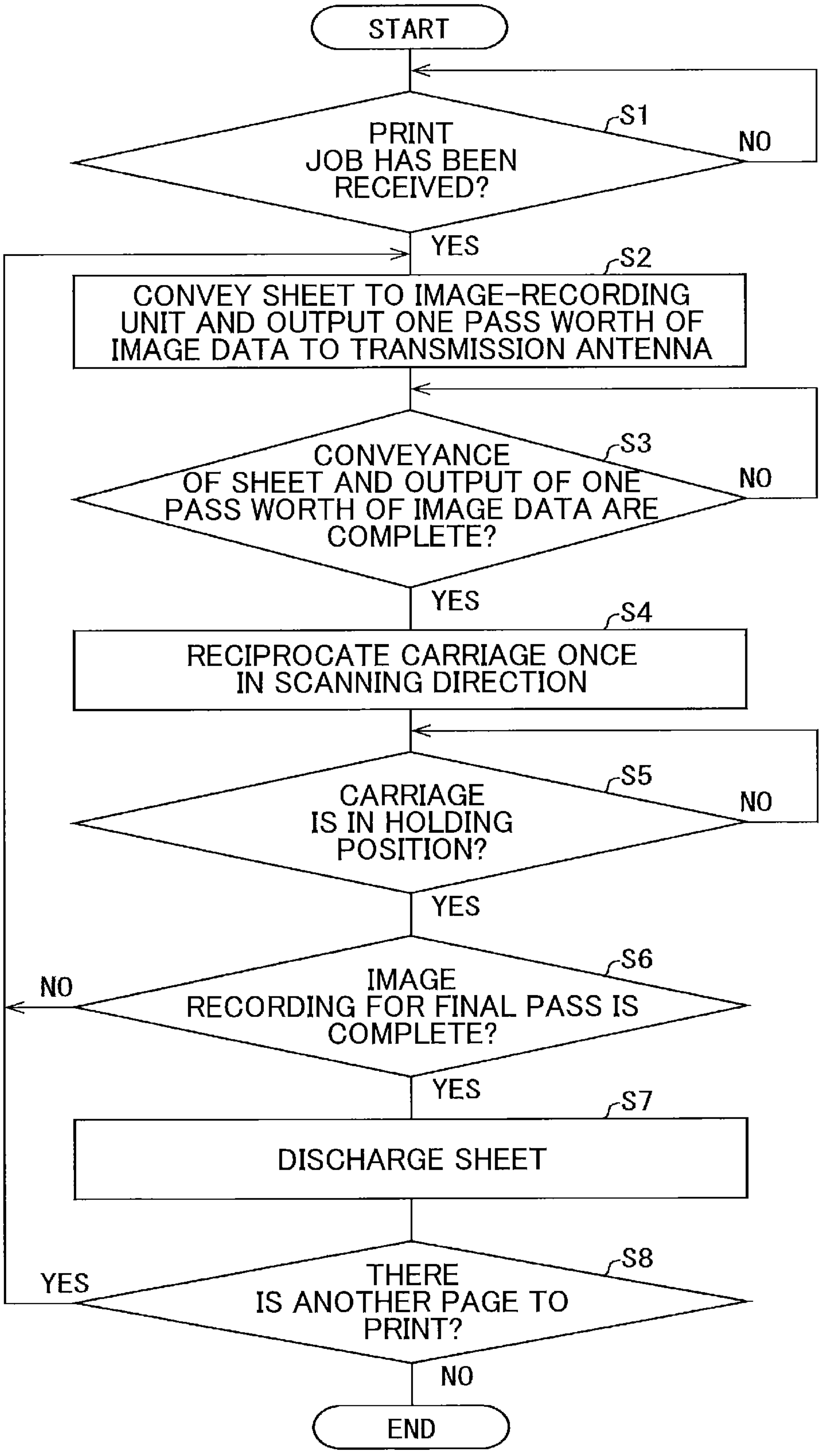
FIG. 5 is a flowchart illustrating sample steps in a control process performed by a first control board of the inkjet printer.
Figure 6:
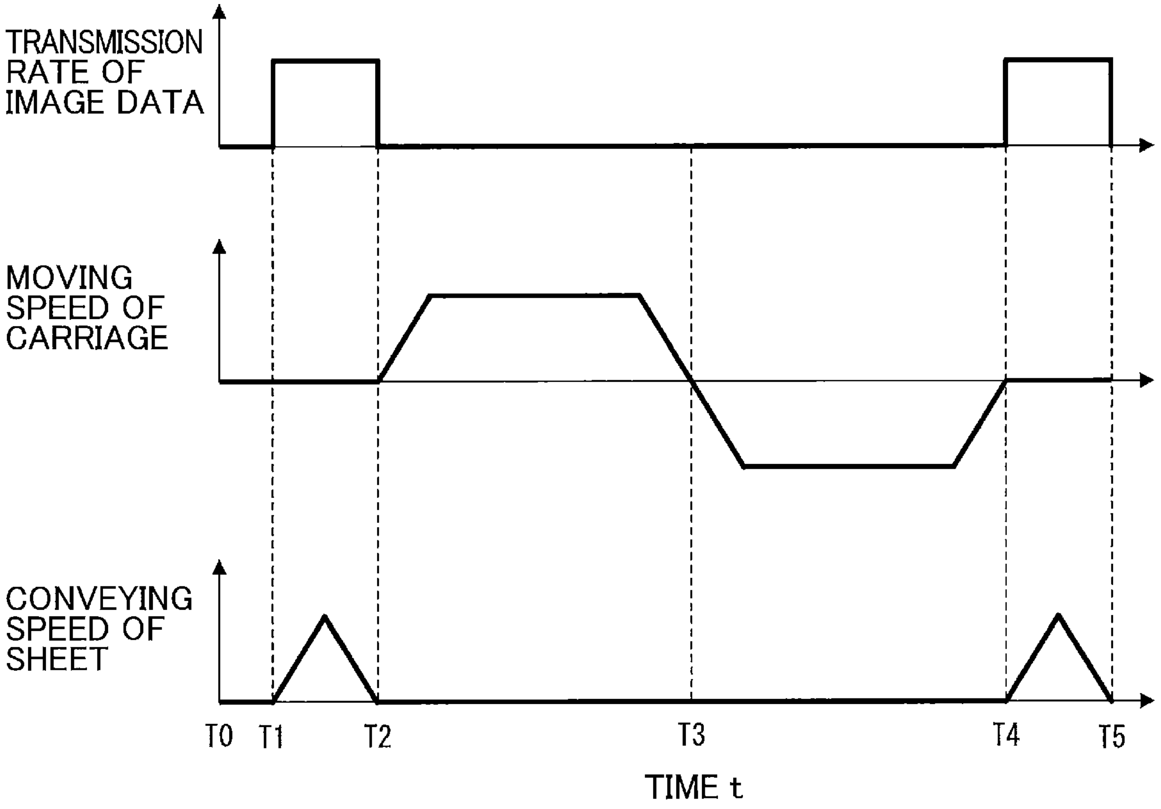
FIG. 6 is a timing chart illustrating an example of relationships among a conveying speed of a sheet, a moving speed of a carriage, and a transmission rate of image data in the inkjet printer.

Next, steps in a control process performed using the first control board 100 in the inkjet printer 1 of the first embodiment will be described with reference to FIGS. 5 and 6. FIG. 5 is a flowchart showing sample steps in the control process performed by the first control board 100. FIG. 6 is a sample timing chart showing relationships among the conveying speed of the sheet P, the moving speed of the carriage 31, and the transmission rate of image data (ejection data) in the inkjet printer 1 according to the first embodiment.

When power to the inkjet printer 1 is turned on (when time t=T0 in FIG. 6), the first control board 100 begins operating. In S1 of the flowchart in FIG. 5, the first control board 100 first determines whether a print job has been received via the communication interface 122. While a print job has not been received (S1: NO), the first control board 100 continually repeats the determination in S1.

If a print job has been received (S1: YES), in S2 the first control board 100 conveys a sheet P to the image-recording unit 3 and outputs one pass worth of image data to the transmission antenna 110. Specifically, while time t is between T1 and T2 in FIG. 6, the first control board 100 drives the conveying motor 108 to rotate the feed roller 23. After a sheet P is fed from the feed tray 21 onto the conveying path R, the first control board 100 continues driving the conveying motor 108 to rotate the conveying rollers 60 and 62 in order to convey the sheet P to the image-recording unit 3.

At the same time, the first control board 100 outputs one pass worth of image data to the transmission antenna 110 via the communication circuit 107. In the first embodiment, the CPU 101 starts up the communication circuit 107 via the ASIC 105 in the first control board 100 when the reception antenna 30 has moved to a position opposing the transmission antenna 110 and the first control board 100 issues a command to the transmission antenna 110 to transmit ejection signals to the reception antenna 30.

FIG. 6 shows a case in which the time required for transmitting image data is the same as the time required for conveying a sheet P, but this is only one example. The time required for transmitting image data varies according to the quantity of image data. In other words, more time is required for transmitting image data between the transmission antenna 110 and reception antenna 30 when the quantity of image data is larger.

Upon receiving a command from the communication circuit 107, the transmission antenna 110 transmits one pass worth of image data to the reception antenna 30. The image data is transmitted as ejection signals using TransferJet. The reception antenna 30 transfers the ejection signals received from the transmission antenna 110 to the second control board 200. Once the transfer of ejection signals from the reception antenna 30 to the second control board 200 is complete, the reception antenna 30 transmits a signal transmission complete notification to the transmission antenna 110. Here, one pass worth of image data refers to the quantity of data for recording an image in one line on the sheet P while the carriage 31 moves one direction in the scanning direction.

After completing the process in S2, in S3 the first control board 100 determines whether the sheet P has been conveyed to the image-recording unit 3 and all image data for one pass has been outputted. Specifically, the first control board 100 determines whether conveyance of the sheet P to the image-recording unit 3 is complete based on the results of detections by the rotary encoder 111 and registration sensor 120. Further, the first control board 100 determines whether output of one pass worth of image data to the transmission antenna 110 is complete based on whether a signal transmission complete notification has been received from the reception antenna 30 via the communication circuit 107.

If conveyance of the sheet P and output of one pass worth of image data are complete (S3: YES), the first control board 100 advances to S4. However, if conveyance of the sheet P is not complete or if all image data for one pass has not been outputted (S3: NO), the first control board 100 loops back to S3 and repeats the determination.

In S4 the first control board 100 drives the carriage motor 109 to move the carriage 31 back and forth once in the scanning direction, i.e., to reciprocate the carriage 31 once in the scanning direction. At this time, the first control board 100 performs an image recording process described below.

That is, while time t is between T2 and T3 in FIG. 6, the first control board 100 drives the carriage motor 109 to move the carriage 31 from the holding position HP to the ejection terminating position EP (see FIG. 4) while ejecting ink droplets from nozzles 33 onto the sheet P to record an image on the sheet P for one line. Conveyance of the sheet P is halted during this operation.

Next, while time t is between T3 and T4 in FIG. 6, the first control board 100 drives the carriage motor 109 to move the carriage 31 back from the ejection terminating position EP to the holding position HP.

In S5 the first control board 100 determines whether the carriage 31 is in the holding position HP. Specifically, the first control board 100 determines whether the carriage 31 is in the holding position HP based on the results of detections by the linear encoder 121. If the carriage 31 is in the holding position HP (S5: YES), the first control board 100 advances to S6. However, if the carriage 31 is not in the holding position HP (S5: NO), the first control board 100 returns to S5.

In S6 the first control board 100 determines whether the image for the final pass has been recorded. If image recording for the final pass has not been completed (S6: NO), the first control board 100 returns to S2. Here, while time t is between T4 and T5 in FIG. 6, the first control board 100 drives the conveying motor 108 to rotate the conveying rollers 60 and 62 in order to convey the sheet P one line worth in the conveying direction. At the same time, the first control board 100 outputs image data for one pass to the transmission antenna 110. Specifically, the first control board 100 issues a command to the transmission antenna 110 to transmit ejection signals to the reception antenna 30 once the reception antenna 30 has moved to a position opposing the transmission antenna 110. Thereafter, the first control board 100 repeatedly performs the process from S2 to S6 until the image for the final pass has been recorded.

Once image recording for the final pass is complete (S6: YES), in S7 the first control board 100 drives the conveying motor 108 to rotate the conveying rollers 60 and 62 in order to discharge the sheet P into the discharge tray 22. In S8 the first control board 100 determines whether there is another page to print in the current print job. If there is another page to print (S8: YES), the first control board 100 returns to S2. However, if there are no more pages to print (S8: NO), the process in FIG. 5 ends.

With the inkjet printer 1 according to the first embodiment described above, the transmission antenna 110 connected to the first control board 100 via the communication circuit 107 transmits ejection signals to the reception antenna 30 disposed on the carriage 31 through near field communication. This process enables the first control board 100 to control the ejection of ink from nozzles 33. Hence, the inkjet printer 1 need not be provided with dedicated wiring for transmitting ejection signals. The above configuration can prevent noise generated in such signal transmission wiring from interfering with communication. Further, power consumption is less when using a transmission antenna 110 that has a communication range A smaller than the size of the casing 10 rather than when using a wide-range antenna.

Use of the TransferJet near field communication technology in particular enables the first control board 100 to transmit a large volume of ejection signals to the reception antenna 30 at a high rate of speed via the transmission antenna 110 and the reception antenna 30. Further, setting the transfer distance L in the TransferJet range to a value (e.g., about 3 cm) smaller than the distance that the carriage 31 reciprocates can reliably prevent communication interference and facilitate the creation of a compact transmission antenna 110.

Further, the flat plate-like transmission antenna 110 is arranged longitudinally in the same direction as the flat plate-like reception antenna 30. Accordingly, communication loss during the transmission of ejection signals is less than if the transmission antenna 110 were to extend in a direction orthogonal to the extended direction of the reception antenna 30.

Additionally, the transfer distance L of the transmission antenna 110 is set to a sufficiently small distance that allows for communication between the reception antenna 30 and transmission antenna 110 only when the reception antenna 30 provided on the carriage 31 overlaps the transmission antenna 110 in the scanning direction. This configuration allows for a more compact transmission antenna 110 and reception antenna 30 and can lead to power savings.

The first control board 100 can further suppress power consumption by starting up the communication circuit 107 only when the reception antenna 30 has reached a position opposite the transmission antenna 110. Further, since the transmission antenna 110 transmits only a quantity of image data for one pass to the reception antenna 30, the first control board 100 can minimize the amount of image data being transmitted, reducing the required capacity for memory provided on the second control board 200.

Second Embodiment

Next, an inkjet printer 1A according to a second embodiment of the present disclosure will be described with reference to FIGS. 7 and 8. For convenience in the following description, components having similar functions to those described in the first embodiment are designated with the same reference numerals to avoid duplicating description.

Figure 7:
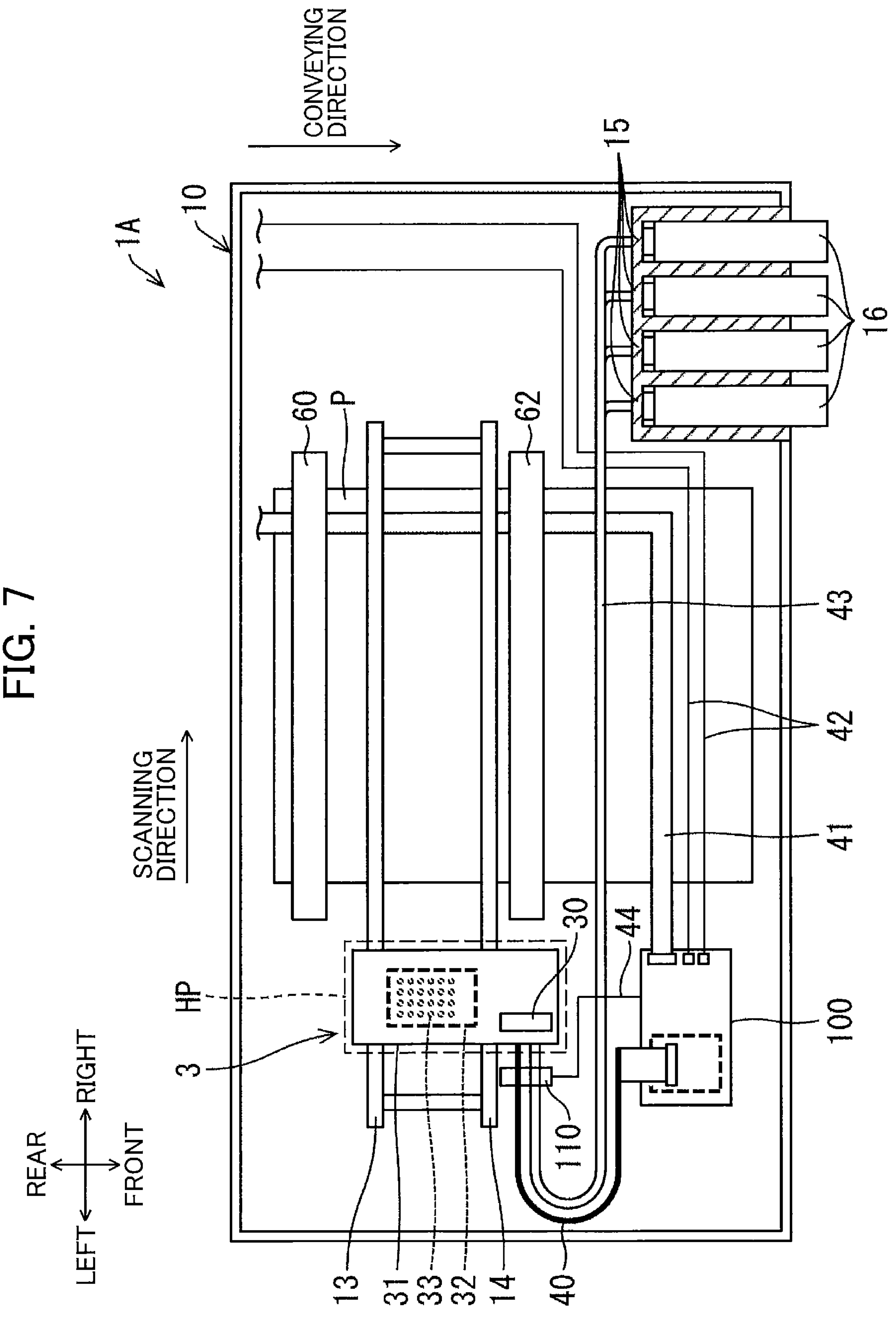
FIG. 7 is a plan view illustrating an internal structure of an inkjet printer.

FIG. 7 is a plan view showing the internal structure of the inkjet printer 1A according to the second embodiment. FIG. 8 is a timing chart showing an example of relationships among the conveying speed of the sheet P, the moving speed of the carriage 31, and the transmission rate of image data (ejection data) for the inkjet printer 1A according to the second embodiment.

As shown in FIG. 7, the transmission antenna 110 in the inkjet printer 1A of the second embodiment is disposed at a position opposing the reception antenna 30 on the carriage 31 in the scanning direction when the carriage 31 is in the holding position HP.

The first control board 100 is disposed in one side of the casing 10 in the left-right direction, and specifically on the left side in FIG. 7. The transmission antenna 110 is similarly disposed in the left side of the casing 10 and to the rear of the first control board 100. The first control board 100 and transmission antenna 110 are connected to each other via the wiring harness 44.

Figure 8:
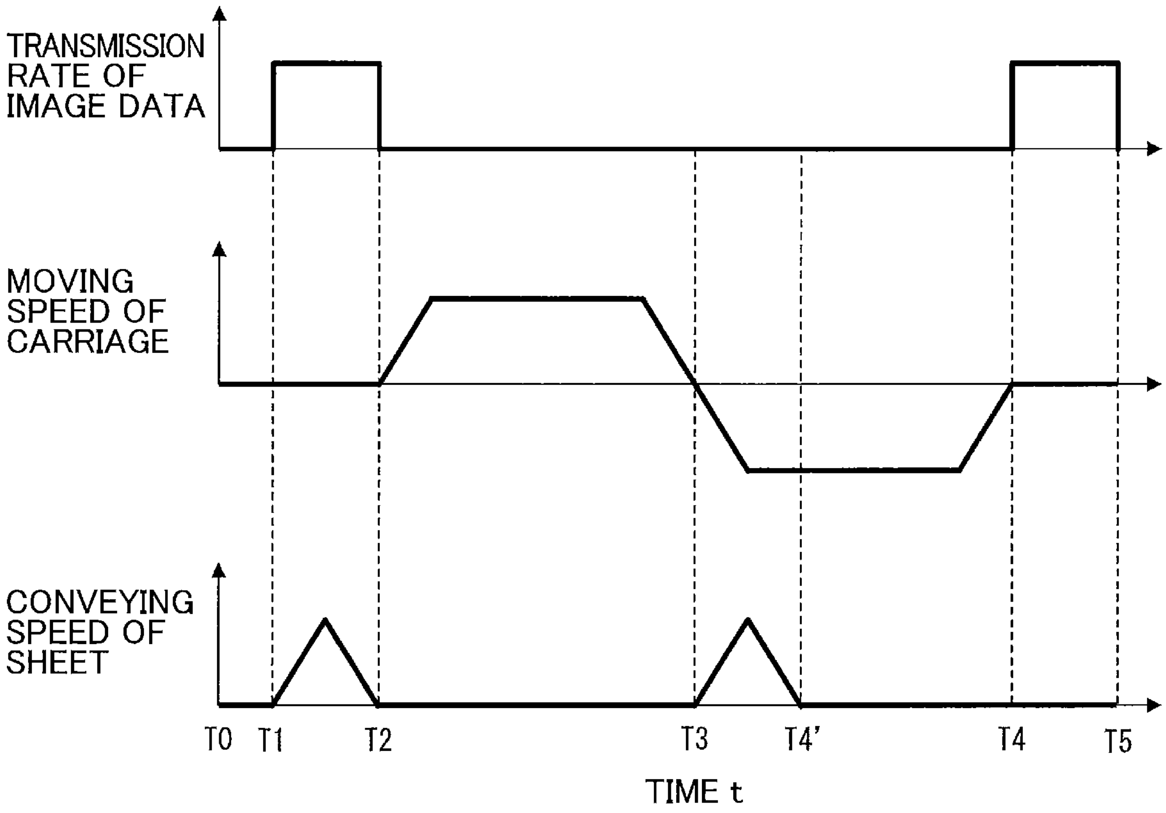
FIG. 8 is a timing chart illustrating an example of relationships among a conveying speed of a sheet, a moving speed of a carriage, and a transmission rate of image data for the inkjet printer illustrated in FIG. 7.

As shown in the timing chart of FIG. 8 according to the second embodiment, after the carriage 31 has been moved in one direction from the holding position HP to the ejection terminating position EP in S4 of FIG. 5, the sheet P is conveyed the prescribed amount in the conveying direction while the carriage 31 is being returned to the holding position HP, i.e., while time t is between T3 and T4'. Hence, the sheet P is conveyed sooner than in the first embodiment, achieving a more efficient printing process. Reducing the time required for performing the printing process is particularly effective when the time required for conveying the sheet P is longer than the time required for transmitting image data.

In the inkjet printer 1A according to the second embodiment described above, the transmission antenna 110 is disposed on the same left-right side of the casing 10 as the first control board 100. That is, the transmission antenna 110 is disposed on the left side in FIG. 7. The transmission antenna 110 is connected to the first control board 100 via the wiring harness 44. According to this configuration, the transmission antenna 110 and first control board 100 are disposed on the same side (i.e., the left side in FIG. 7) of the casing 10 relative to the scanning direction. Therefore, the length of the wiring harness 44 connecting the first control board 100 to the transmission antenna 110 can be made shorter than when the transmission antenna 110 and first control board 100 are disposed on different sides of the casing 10 relative to the scanning direction.

Third Embodiment

Next, an inkjet printer 1B according to a third embodiment of the present disclosure will be described with reference to FIG. 9. For convenience in the following description, components having similar functions to those described in the first embodiment are designated with the same reference numerals to avoid duplicating description.

Figure 9:
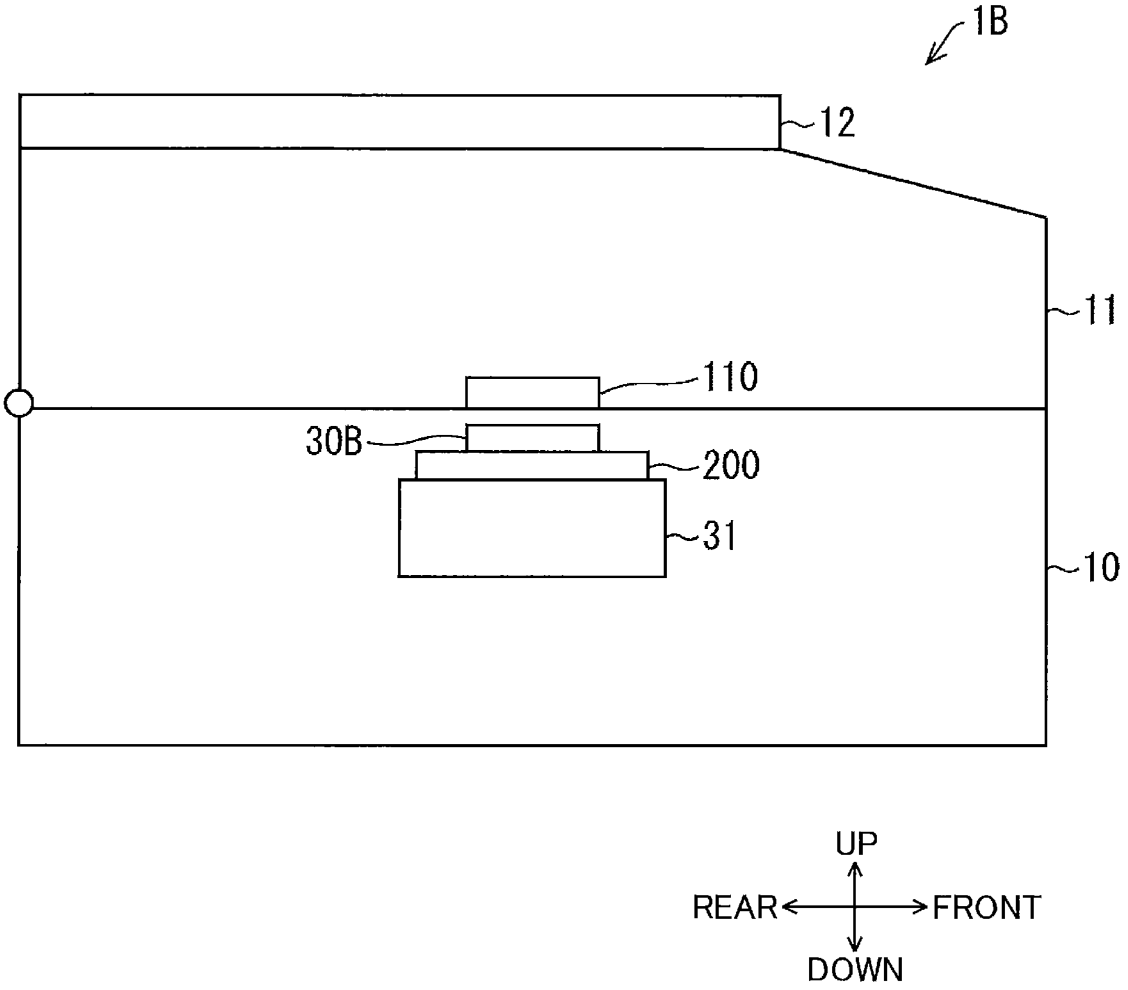
FIG. 9 is a side view illustrating a schematic structure of an inkjet printer.

As shown in FIG. 9, a scanner 11 is disposed on top of the casing 10 in the inkjet printer 1B according to the third embodiment. A cover 12 is rotatably attached to the top of the scanner 11. The transmission antenna 110 is disposed on the bottom surface of the scanner 11.

The second control board 200 is disposed on the top surface of the carriage 31. A reception antenna 30B configured by a circuit board pattern is disposed on the top surface of the second control board 200. Thus, the reception antenna 30 is disposed in a position opposing the transmission antenna 110 vertically with a gap formed therebetween.

The inkjet printer 1B according to the third embodiment described above can obtain the same effects as the inkjet printer 1 in the first embodiment. In particular, since the reception antenna 30B is formed of a circuit board pattern disposed on the second control board 200, the second control board 200 and reception antenna 30B can be integrally manufactured, thereby reducing the number of required parts.

Other Embodiments

In the first embodiment described above, the first control board 100 is described as outputting one pass worth of image data to the transmission antenna 110 in S2 of the process in FIG. 5, but the present disclosure is not limited to this method. The first control board 100 may output image data for a plurality of passes to the transmission antenna 110.

For example, the transmission antenna 110 may be configured to transmit two passes worth of image data to the reception antenna 30 as ejection signals. In this case, after recording an image for the first pass, the first control board 100 records an image for the second pass while time t is between T3 and T4 shown in FIG. 6, i.e., while the carriage 31 is moving from the ejection terminating position EP to the holding position HP. This method increases printing speed since two passes worth of image data can be sent in a single data transmission.

Moreover, the transmission antenna 110 can transmit these two passes worth of image data to the reception antenna 30 while the sheet P is being conveyed in the conveying direction the prescribed distance, and specifically an amount equivalent to one line. According to this method, the first control board 100 can reduce processing time for printing by transmitting two passes worth of image data while time t is between T4 and T5 in FIG. 6.

TransferJet is used as the near field communication method in the first through third embodiments described above, but the present disclosure may be applied to any communication technology that has a smaller communication range A for near field communication than the size of the casing 10. For example, the NFC technology may be used for near field communication. The communication range for NFC is set to about 10 cm, for example, which is shorter than the distance that the carriage 31 reciprocates.

While the transmission antenna 110 is disposed on the bottom surface of the scanner 11 in the third embodiment described above, the transmission antenna 110 may be disposed on the underside surface of the cover 12, for example.

In the first through third embodiments described above, the transmission antenna 110 is arranged in a position for opposing the reception antenna 30 while the carriage 31 is in the holding position HP, but the present disclosure is not limited to this layout. For example, a surface of the transmission antenna 110 extending in the longitudinal direction of the same may be oriented orthogonal to a surface of the reception antenna 30 extending along the longitudinal direction of the same while the carriage 31 is in the holding position HP.

Alternatively, a plurality of transmission antennas 110 may be arranged at intervals along the scanning direction. In this case, the plurality of transmission antennas 110 can transmit ejection signals to the reception antenna 30, enabling ejection signals to be transmitted to the reception antenna 30 more reliably.

While the description has been made in detail with reference to specific embodiments, it would be apparent to those skilled in the art that many modifications and variations may be made thereto without departing from the spirit of the disclosure, the scope of which is defined by the attached claims.

What is claimed is:

1. An inkjet printer comprising:

a casing;

a first control board provided in the casing;

a carriage configured to reciprocate in a scanning direction crossing a conveying direction of a recording medium;

a head mounted in the carriage and having a plurality of nozzles;

a transmission antenna connected to the first control board, the transmission antenna being configured to transmit, through near field communication, an ejection signal for controlling ejection of ink from the plurality of nozzles;

a reception antenna provided in the carriage, the reception antenna being configured to receive the ejection signal from the transmission antenna; and a second control board provided in the carriage, the second control board having a plate-like shape following a plane extending in the conveying direction and the scanning direction, the second control board being configured to control the ejection of the ink from the plurality of nozzles based on the ejection signal received by the reception antenna, wherein the near field communication has a communication range smaller than a size of the casing, wherein the transmission antenna has a plate-like shape extending in a prescribed direction, and the reception antenna has a plate-like shape extending in the prescribed direction, wherein the reception antenna is configured by a circuit board pattern arranged along the second control board, and wherein the transmission antenna is arranged in a position opposing the reception antenna with a gap formed between the transmission antenna and the reception antenna, the transmission antenna opposing the reception antenna in an opposing direction orthogonal to the conveying direction and the scanning direction.

2. The inkjet printer according to claim 1, wherein the near field communication has a transfer distance shorter than a movement distance in one direction in a reciprocating motion of the carriage.

3. The inkjet printer according to claim 1, wherein a communication standard employed by the near field communication is TransferJet or TranferJet X.

4. The inkjet printer according to claim 1, further comprising:

a wiring harness connecting the first control board to the transmission antenna, wherein the casing has one end portion and another end portion in the scanning direction, the first control board being arranged in the one end portion, the transmission antenna being arranged in the one end portion.

5. The inkjet printer according to claim 1, wherein the near field communication has a transfer distance allowing for communication between the transmission antenna and the reception antenna only when the carriage overlaps the transmission antenna in the scanning direction.

6. The inkjet printer according to claim 5, wherein the first control board comprises:

a communication circuit configured to communicate with the reception antenna, the communication circuit being configured to output the ejection signal; and a processor configured to start up the communication circuit at a time when the reception antenna reaches a position opposing the transmission antenna.

7. The inkjet printer according to claim 6, wherein image data for one pass represents an image to be recorded on the recording medium while the carriage is moving in one direction in the scanning direction in a reciprocating motion of the carriage, and wherein the transmission antenna is configured to transmit image data for a plurality of passes to the reception antenna as the ejection signal.

8. The inkjet printer according to claim 7, wherein the transmission antenna is configured to transmit image data for two passes to the reception antenna as the ejection signal while the recording medium is being conveyed in the conveying direction a prescribed distance.

9. The inkjet printer according to claim 6, wherein image data for one pass represents an image to be recorded on the recording medium while the carriage is moving in one direction in the scanning direction in a reciprocating motion of the carriage, and wherein the transmission antenna is configured to transmit image data for one pass to the reception antenna as the ejection signal.

10. An inkjet printer, comprising:

a casing;

a first control board provided in the casing;

a carriage configured to reciprocate in a scanning direction crossing a conveying direction of a recording medium;

a head mounted in the carriage and having a plurality of nozzles;

a transmission antenna connected to the first control board, the transmission antenna being configured to transmit, through near field communication, an ejection signal for controlling ejection of ink from the plurality of nozzles;

a reception antenna provided in the carriage, the reception antenna being configured to receive the ejection signal from the transmission antenna; and a conveying portion configured to convey the recording medium in the conveying direction, wherein the near field communication has a communication range smaller than a size of the casing, wherein the near field communication has a transfer distance allowing for communication between the transmission antenna and the reception antenna only when the carriage overlaps the transmission antenna in the scanning direction, wherein the first control board comprises:

a communication circuit configured to communicate with the reception antenna, the communication circuit being configured to output the ejection signal; and a processor configured to start up the communication circuit at a time when the reception antenna reaches a position opposing the transmission antenna, wherein image data for one pass represents an image to be recorded on the recording medium while the carriage is moving in one direction in the scanning direction in a reciprocating motion of the carriage, wherein the transmission antenna is configured to transmit image data for one pass to the reception antenna as the ejection signal, wherein the carriage is configured to reciprocate between a first position and a second position in the scanning direction, the first position being positioned outside a pass-through region through which the recording medium passes by being conveyed with the conveying portion, wherein the carriage is at the first position when the carriage is in an idle state, the ink being not ejected from the plurality of nozzles during the idle state, wherein the carriage is at the second position when the ejection of the ink from the plurality of nozzles onto the recording medium is terminated, wherein the reception antenna opposes the transmission antenna when the carriage is at the first position, wherein the first control board is configured to issue a command to the transmission antenna to transmit the ejection signal to the reception antenna when the carriage is at the first position, and wherein the conveying portion is configured to convey the recording medium in the conveying direction a prescribed distance while the carriage is moving from the second position to the first position after the carriage has moved from the first position to the second position.

* * * * *